S. BAALSRUD.
MEANS FOR READING OFF ANGLE MEASUREMENTS IN TACHYMETERS AND OTHER ANGLE MEASURING INSTRUMENTS.
APPLICATION FILED FEB. 12, 1915.

1,263,353.

Patented Apr. 16, 1918.
3 SHEETS—SHEET 1.

WITNESSES

INVENTOR
Sigurd Baalsrud
BY
Lucius E. Varney
ATTORNEY

S. BAALSRUD.
MEANS FOR READING OFF ANGLE MEASUREMENTS IN TACHYMETERS AND OTHER ANGLE MEASURING INSTRUMENTS.
APPLICATION FILED FEB. 12, 1915.

1,263,353.

Patented Apr. 16, 1918.
3 SHEETS—SHEET 2.

WITNESSES

INVENTOR
Sigurd Baalsrud
BY
Lucius E. Varney
ATTORNEY

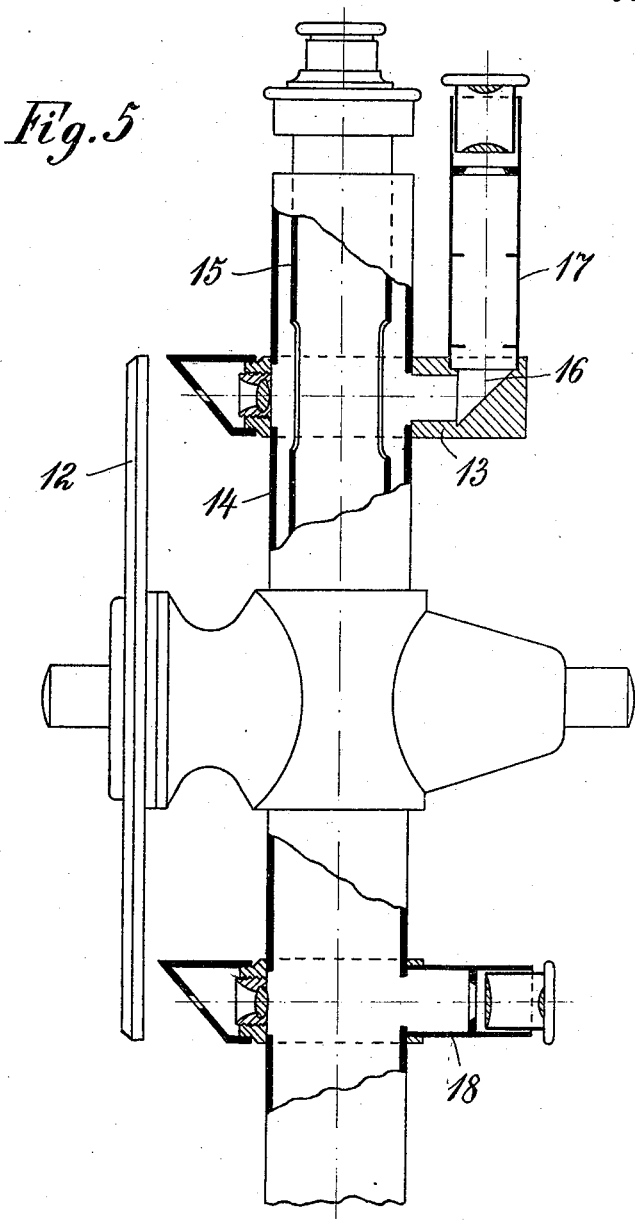

UNITED STATES PATENT OFFICE.

SIGURD BAALSRUD, OF CHRISTIANIA, NORWAY.

MEANS FOR READING OFF ANGLE MEASUREMENTS IN TACHYMETERS AND OTHER ANGLE-MEASURING INSTRUMENTS.

1,263,353.　　　　　Specification of Letters Patent.　　Patented Apr. 16, 1918.

Application filed February 12, 1915. Serial No. 7,903.

*To all whom it may concern:*

Be it known that I, SIGURD BAALSRUD, a subject of the King of Norway, residing at Christiania, Norway, have invented certain new and useful Improvements in Means for Reading Off Angle Measurements in Tachymeters and other Angle-Measuring Instruments, of which the following is a specification.
In the present angle-measuring instruments such as tachymeters and theodolites the microscopes and magnifying glasses for reading the angles are placed in such a way that they are very liable to be brought out of their proper position, are easily damaged and make the reading difficult, because it is necessary, at all events as regards the reading of the horizontal angles, for the operator to move around the instrument, and by this movement the position of the latter is easily deranged, such moving also occasioning loss of time.

The invention here described is intended to do away with the above mentioned inconveniences and imperfections.

As regards the means for measuring of the horizontal angles, said defects and inconveniences are remedied by raising the lid or cover so much as to give room underneath it for two object-tubes or magnifiers respectively. For this purpose, the head of the pivot is adapted to form a stand for the said object-glasses or magnifiers respectively and the latter are placed in a horizontal position diametrically opposite each other and directed toward the center-line of the instrument; in the center two rectangular prisms are mounted at an angle of 90 degrees, which deflect the rays of light at a right angle to the axis of the object-glasses, and in the line of the deflected rays a prism is placed which deflects the rays to a common ocular tube.

Further the base-plate of the instrument is provided with an up-turned edge so as to provide a cylindrical surface for placing the division lines. The latter will then be parallel instead of concentric, as at present, whereby the reading off is facilitated.
With regard to the means for reading the vertical angles, the arrangement is made, that the division lines are placed on the side of the circle disk turning toward the telescope, and the reading off microscope for reading it off is, or both microscopes if two be used, are placed upon the tube of the telescope, the latter as well as the ocular tube being perforated or slotted so that the rays of light may cross the axial line of the telescope. The axis of the microscope which lies next to the ocular end of the telescope is deflected by a rectangular prism, so that the eye pieces of the microscope comes beside that of the telescope, and thus also in this case the reading off can be done from the sighting stand point of the operator; only when both miscroscopes are used is it necessary for the operator to change position.

The invention is explained by the accompanying drawings on which—

Fig. 5 shows plan view, partly section, of a telescope, with microscopes for reading vertical angles.

Figure 1:
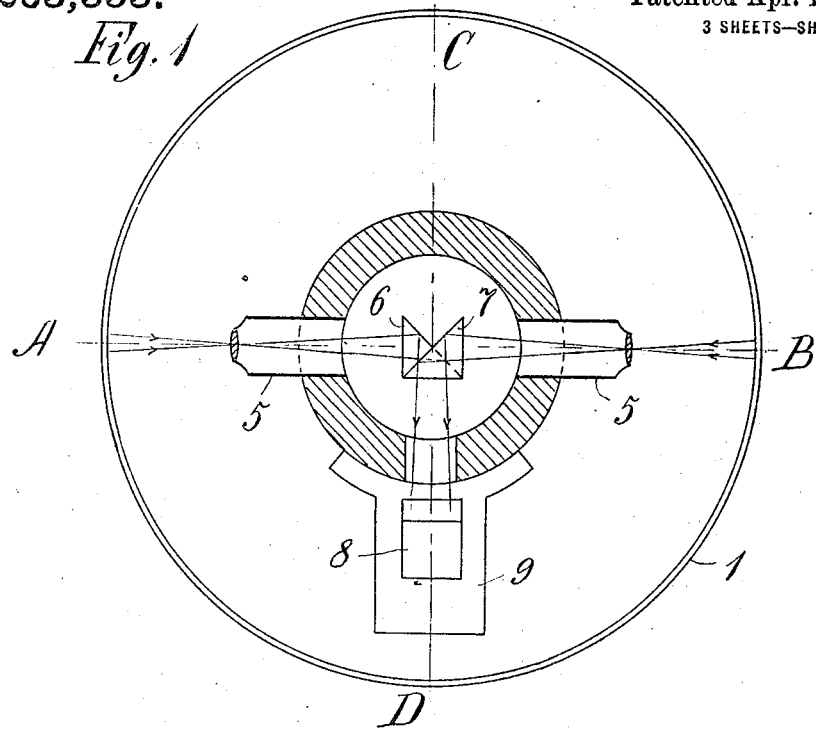
Figure 1 shows a plan of the instrument with the cover removed.
Figure 2:
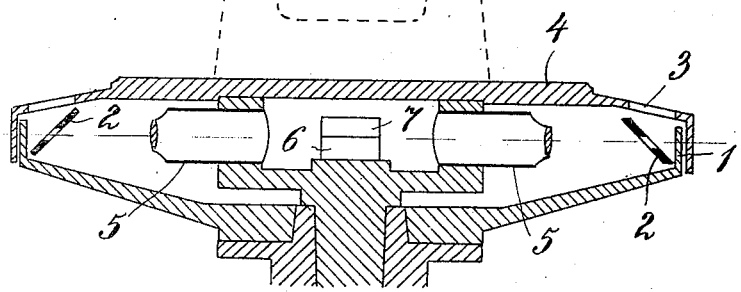
Fig. 2 shows a vertical section on the line A—B in Fig. 1.
Figure 3:
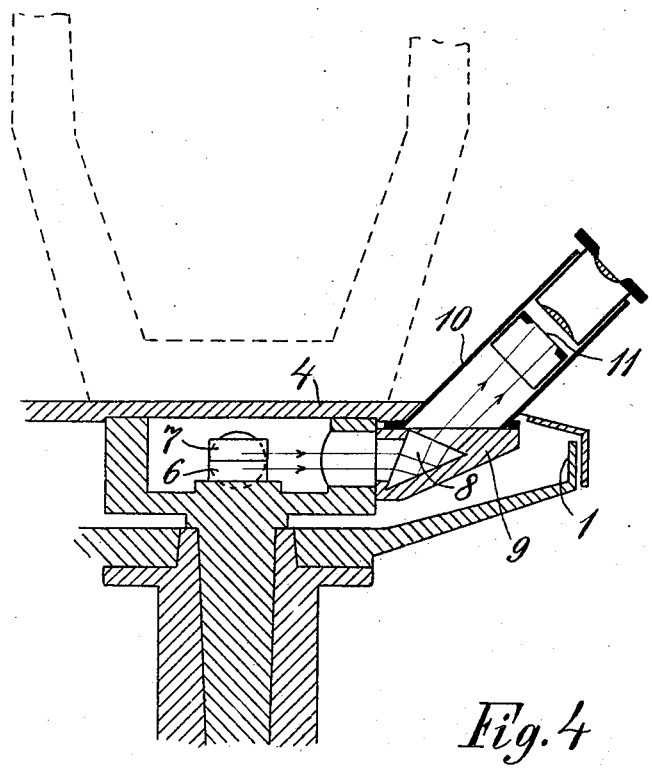
Fig. 3 shows a vertical section on the line C—D in Fig. 1.
Figure 4:
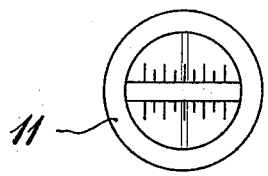
Fig. 4 shows a detail.

In Figs. 1, 2 and 3 the reference 1 indicates the vertical division surface of the horizontal circle, 2 is a reflector which projects the rays entering through an opening 3 in the cover 4 onto the division surface in order to give it light. 5 is two microscopes, which are fixed to the pivot of the instrument. Said pivot is, for this purpose, adapted to form a stand for the two object tubes and for angular prisms 6 and 7 placed in the center. At right angles to the axis of the two object tubes a prism 8 is fixed to a bracket 9 attached to the pivot of the instrument in such wise that said prism 8 receives the rays from the two prisms 6 and 7 and sends them to an ocular tube 10, mounted on the same bracket, and in the ocular 11 the division bars appear like two images one above the other, see Fig. 4.

The ocular tube 10 projects through a corresponding aperture in the cover 4.

By the construction described above the more delicate parts of the instrument are stored entirely away, so that they can neither be damaged nor be deranged; it is only the less delicate ocular tube that is at all exposed.

In Fig. 5 12 is the vertical circle, the divisions of which are on the surface facing the telescope. 13 is the microscope nearest the eye piece of the telescope, said microscope being attached to the telescope tube 14. Both the telescope tube and the ocular tube 15 are provided with apertures, and the microscope is so placed that its axis crosses that of the telescope. In order to be able to read off from the sighting point, the microscope's axis is deflected by a prism 16 and the ocular tube 17 is placed alongside that of the telescope.

If yet another microscope 18 is required, it is placed on the telescope tube in a similar manner to the one above described, but the ocular tube is applied without any deflection of its axis.

By this arrangement greater safety for the microscopes is attained, they being less exposed to injury and not being liable to derangement, and moreover the great advantage is gained that the division circle can be made larger than at present.

Claim:

In an instrument for measuring angles, in combination, a stand; a circular member supported thereby and presenting a vertical surface; a scale upon said surface; light reflecting means for said scale; a pivot on said stand; two diametrically opposed microscopes supported by said pivot and having their outer ends directed toward said scale; two rectangular triangular prisms supported by said pivot between the inner ends of said microscopes, to reflect the two images from said microscopes at right angles to the latters' axis; an ocular supported by said pivot; and a third prism to reflect said two images to said ocular, said microscopes, prisms, scale and light reflecting means being inclosed to protect them from injury.

In testimony whereof I affix my signature in presence of two witnesses.

SIGURD BAALSRUD.

Witnesses:
N. G. TANDBERG,
M. GUTHOMSEY.

Copies of this patent may be obtained for five cents each, by addressing the "Commissioner of Patents, Washington, D. C."